Jan. 16, 1923.

R. WATSON.

1,442,311.

MEANS FOR PREVENTING NEEDLESS IDLING OF INTERNAL COMBUSTION MOTORS.

FILED NOV. 17, 1920.

Inventor

Robert Watson

Jan. 16, 1923.
R. WATSON.
MEANS FOR PREVENTING NEEDLESS IDLING OF INTERNAL COMBUSTION MOTORS.
FILED NOV. 17, 1920.

Inventor
Robert Watson

Patented Jan. 16, 1923.

1,442,311

UNITED STATES PATENT OFFICE.

ROBERT WATSON, OF SILVER SPRING, MARYLAND.

MEANS FOR PREVENTING NEEDLESS IDLING OF INTERNAL-COMBUSTION MOTORS.

Application filed November 17, 1920. Serial No. 424,735.

*To all whom it may concern:*

Be it known that I, ROBERT WATSON, a citizen of the United States, residing at Silver Spring, in the county of Montgomery and State of Maryland, have invented certain new and useful Improvements in Means for Preventing Needless Idling of Internal-Combustion Motors, of which the following is a specification.

This invention relates to means for preventing needless idling of automobile engines. In the operation of motor-driven vehicles, particularly trucks and delivery wagons, equipped with internal combustion motors, waste of fuel and needless wear and tear on the motor occur by reason of the failure of the operator to stop the motor when the vehicle is stopped for loading or unloading, delivering packages, etc., and similar waste and wear occur by reason of the operator starting the engine and allowing it to run idly for an unnecessarily long period of time before he is ready to start the vehicle. This practice occurs more particularly in the operation of vehicles which are not provided with automatic starters, and with such vehicles a careless operator will often allow the engine to idle during long stops of the vehicle, to avoid the trouble of starting the engine by a hand crank.

In order to prevent this waste, I provide means whereby if the motor is started and allowed to run idly, it will be automatically stopped after it has operated for a predetermined period of time, or after making a predetermined number of revolutions; or, if the motor has been driving the vehicle and the operator brings the vehicle to a stop, without stopping the motor, the latter will be automatically stopped after it has operated idly for a predetermined period of time or made a given number of revolutions. I also provide means whereby, if the vehicle is stopped by the traffic while en route, the operator may prolong the idling time of the motor so as to be ready to start the vehicle as soon as the way is clear.

In the accompanying drawing.

Figure 4:
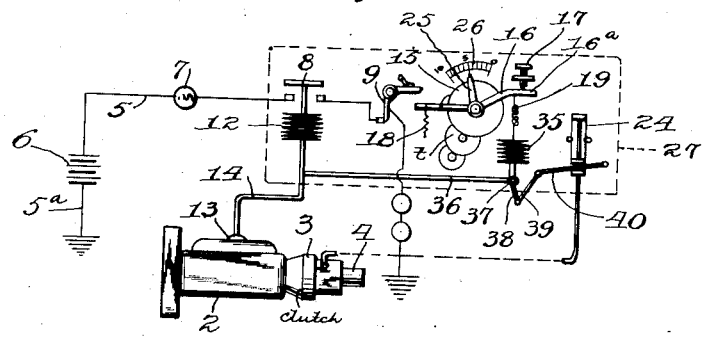
Fig. 4 is a similar view, showing mechanically controlled devices for causing the stoppage of the motor.
Figure 5:
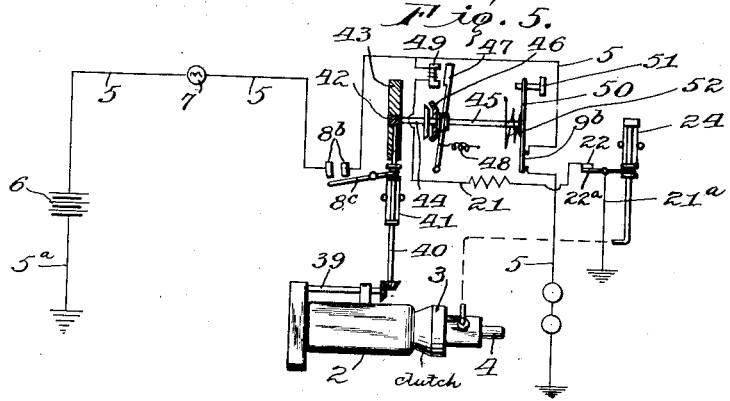
Figure 4A:
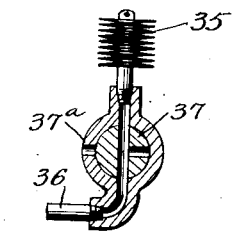
Figure 5A:
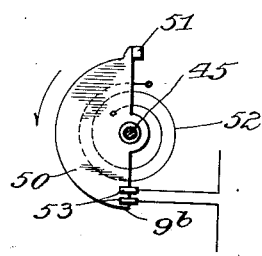

Fig. 4ª is a detail view of the two-way valve shown in Fig. 4;

Fig. 5 is a diagrammatic view showing means for stopping the motor after the latter has operated idly for a predetermined number of revolutions;

Fig. 5ª is a detail view of the time-controlled switch shown in Fig. 5.

Figure 1:
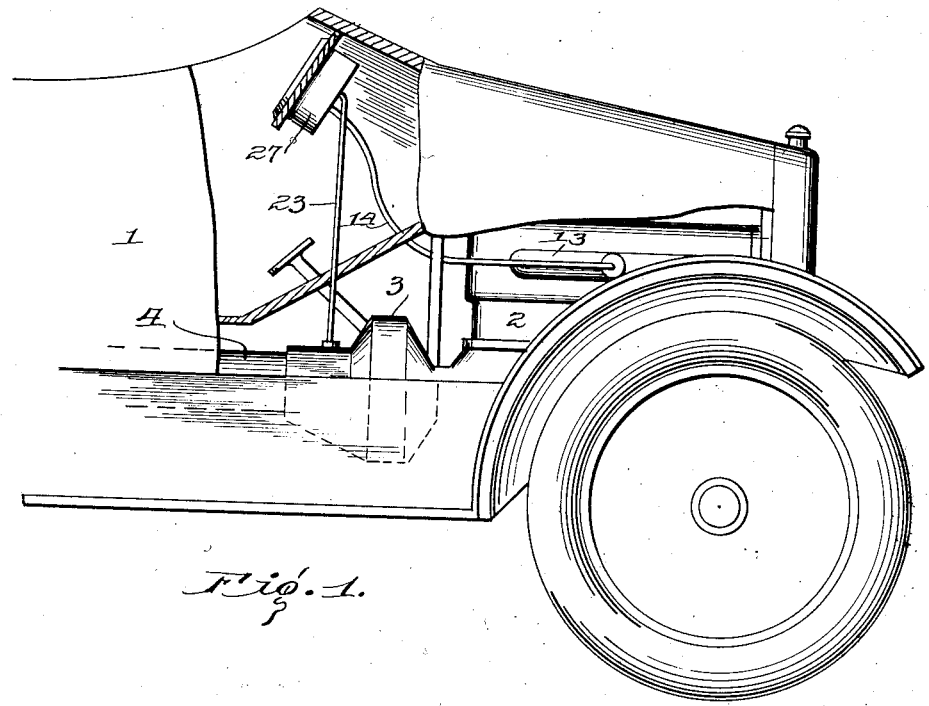
Fig. 1 is a side view, partly broken away, of a vehicle equipped with an internal combustion engine and provided with my improvements.
Figure 2:
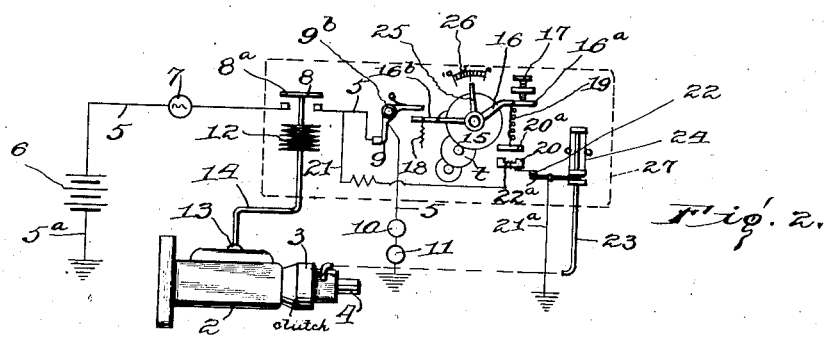
Fig. 2 is a diagrammatic view illustrating one form of the invention, in which the idling motor is stopped, after a predetemined period of time, by electro-magnetically controlled means, the invention being shown in connection with a battery ignition system.

Referring to Figs. 1 and 2, of the drawing, 1 indicates a motor vehicle having an internal combustion driving motor 2, and having the usual clutch, within the casing 3, for connecting the engine with the propeller shaft 4, which transmits the power to the driving axles and wheels of the vehicle.

In Fig. 2, the primary circuit of a battery ignition system for the motor is shown, the secondary circuits to the spark plugs being omitted. This primary circuit 5 extends from a battery 6, through the usual key-controlled switch 7, a normally open switch 8 and a normally closed switch 9 to the spark coil 10, and thence through distributor 11 to ground. The circuit is completed through the frame of the automobile and the ground connection 5ª to the battery, as usual.

The switch 8 is controlled by the motor so as to close when the motor starts and to open when the motor stops. As shown, the movable member 8ª of the switch is secured to the bellows 12, which is connected to the intake pipe of the motor by a tube 14. When the motor is cranked to start it, the suction of the engine causes the bellows to collapse and close the switch. The switch remains closed while the engine is running, but as soon as the motor is stopped and the suction ceases, the bellows expands and opens the switch. This switch leaves the ignition circuit open when the motor is stopped so that the battery cannot discharge through the circuit, and, in closing, controls the actuation of a time mechanism $t$, which operates to open the ignition circuit at the switch 9 in a predetermined time after the motor has started into operation, if the motor operates without load.

This time mechanism may be any suitable retarding device, preferably a clocktrain, as shown, provided with a finely toothed ratchet wheel 15, adapted to be actuated by a lever 16, centrally pivoted at the axis of the wheel and provided with a pawl for engaging the teeth on the wheel. An adjustable stop 17, in line with one arm $16^a$ of the lever, limits the rocking movement of the lever in one direction, and a light spring 18, attached to the opposite arm $16^b$ of the lever constantly tends to hold the lever in engagement with the stop. The movable member $9^b$ of the switch 9 is in the form of a bell crank lever and has one arm projecting into the path of movement of the arm $16^b$ of the ratchet lever, whereby when the ratchet lever is rocked a certain distance from its normal position it will engage the switch arm and open the switch, thereby causing the stoppage of the motor. A short spring 19, which serves as the main spring of the time mechanism, connects the arm $16^a$ of the ratchet lever with the armature $20^a$ of an electromagnet 20. The coil of this magnet is connected through the motor-controlled switch 8 to the battery so that the magnet will be energized when the switch is closed, and will remain de-energized while said switch is open. The magnet circuit, in Fig. 2, comprises a conductor 21, connected to the ignition circuit between the switches 8 and 9 and leading to the magnet coil and thence to a normally closed switch 22, and a conductor $21^a$, leading from said switch to ground. The switch 22 is controlled by a part on the vehicle so as to open when the vehicle is started and to close when the vehicle stops. Thus, in the drawing, a flexible shaft 23, driven by the propeller shaft 4, operates a centrifugal governor 24, which actuates the switch arm $22^a$ to open and close the switch. The governor of an ordinary centrifugally operated speedometer may be used to actuate the switch.

The operation of the apparatus shown in Fig. 2 is as follows: When the motor is cranked to start it, the suction of the motor causes the switch 8 to close, completing the ignition circuit and at the same time completing the circuit through the magnet 20. When the magnet is energized, it attracts its armature and thereby applies tension to the spring 19 which, in turn, causes the ratchet lever 16 to move the clocktrain. If the vehicle is not started, the magnet circuit will remain complete through the switch 22, and after a predetermined lapse of time, the duration of which may be regulated by the adjustment of the screw 17, the ratchet lever will open the switch 9 and interrupt the ignition circuit. The motor will then stop and the suction in the intake pipe will cease, and the bellows 12 will then expand and open the ignition circuit at the switch 8. This cuts off current from the circuit to the magnet 20, which releases its armature and the tension of the main spring 19 is relaxed, allowing the ratchet lever to be pulled back to its normal position against the stop by the spring 18. The return of the ratchet lever allows the switch 9 to close and the ignition circuit is then ready for the next starting operation. If the motor is started and the propelling mechanism of the vehicle is clutched to it before the switch 9 is interrupted by the time mechanism, the governor 24 will cause the switch 22 to open, thereby interrupting the circuit through the magnet, and the ratchet lever will be released and restored to its normal position, where it will remain as long as the vehicle is running and the switch is open. Thus, the starting of the vehicle within the time allowed for the time mechanism to open the switch 9, renders the time mechanism inoperative and prevents the opening of said switch. If, after the motor has been driving the vehicle, the clutch is thrown out and the vehicle is brought to a stop, the switch 22, controlled by the vehicle, will be closed and the magnet will be energized, and if the motor is not stopped by the operator, it will be stopped automatically by the time mechanism which commences to operate as soon as the magnet is energized.

By adjusting the stop 17 to permit the ratchet lever to have a longer movement before interrupting the switch 9, the idling period will be increased and by shortening the movement of the lever, the idling time will be decreased. By means of a pointer 25 on the ratchet arm and a fixed scale 26, reading in minutes, the ratchet arm may be set to allow the motor to idle for any desired number of minutes. The entire mechanism may be enclosed in a casing 27, which is indicated in Fig. 2 by dotted lines.

Figure 3:
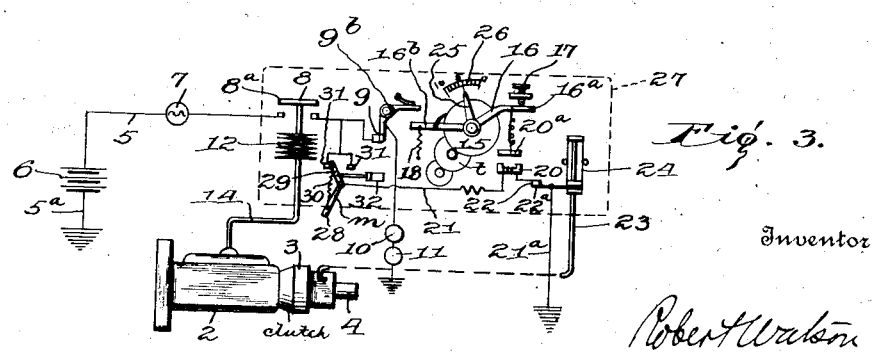
Fig. 3 is a similar view, showing the same arrangement of circuits and parts as in Fig. 2, with the addition of means whereby the operator may prolong the idling time of the motor.

In the arrangement shown in Fig. 2, no provision is made for allowing the operator to prolong the idling period and that is not essential except in the larger cities where the vehicle, while en route, may be stopped, by congestion in the traffic for a longer period than that for which the time mechanism is set to stop the motor. In that case, it is desirable to keep the motor running so that the vehicle can be started the moment the way is clear. For this purpose I provide means whereby the driver can set back the ratchet lever on the time mechanism as often as desired and prevent the stoppage of the motor. Such an arrangement is shown in Fig. 3, wherein the circuits and the parts are the same as in Fig. 2, except for the addition of a manually operable switch m, for momentarily opening the circuit of the magnet to de-energize the magnet and allow the ratchet lever to move back to its initial position. Any suitable form of switch that cannot be left in an off position may be used for this purpose. The switch shown in the drawing comprises a handle 28 and blade 29, pivoted together and connected by a spring 30, which throws the blade from one of the fixed contacts 31 to the other, when the handle is moved past the line of the blade. Thus, the circuit of the magnet is open only during the time that the blade is moving from one of said contacts to the other. In order that the magnet may be de-energized long enough to insure the return of the ratchet lever 16 to its normal position, a dashpot or other retarding device 32 may be connected to the blade 29 to retard its movement from one fixed contact to the other. The end of the handle extends through the casing 27 so as to be accessible to the driver. If the time mechanism is adjusted to stop the motor in, say four minutes, and the driver wishes to extend this time, he may at any time before the lapse of the four minutes, operate the switch m and the ratchet lever of the time mechanism will be set back to its normal position against the stop and will immediately commence to move forward again with the time mechanism. This may be repeated as often as may be necessary. In making ordinary stops, the driver usually leaves the vehicle and if he fails to stop the motor it will be automatically stopped by the time mechanism in the manner described.
In Fig. 4, I have shown an arrangement in which the time mechanism, instead of being operated by a magnet, is operated by a bellows connected to the intake pipe of the motor, and a governor operated by the vehicle actuates a valve which establishes communication between the bellows and the intake pipe when the vehicle is stopped and cuts off this communication while the vehicle is running. Otherwise, the apparatus is the same as in Fig. 1. In Fig. 4, the bellows 35 is connected to the main spring 19 of the time mechanism, and is normally in communication with the intake pipe of the motor through a pipe 36, in which is arranged a two-way valve 37, shown in detail in Fig. 4ª. The valve is provided with an operating lever 38, which is connected by a link 39, to a lever 40, movable by the governor 24.

In operation, when the motor is started, the bellows 12 contracts and closes the ignition circuit, and the bellows 35 also contracts and applies tension to the main spring of the time mechanism. If the vehicle is not connected to the motor within a predetermined time, the time mechanism operates to trip the switch 9 and to stop the motor. If the vehicle is started within the predetermined time, the governor moves the two-way valve to cut off communication between the bellows 35 and the motor and to establish communication between the interior of the bellows and atmosphere through the port 37ª. The bellows immediately expands and relieves the tension on the spring 19 and the ratchet lever is returned to its normal position against the adjustable stop 17 by the spring 18. The ratchet lever remains in this position until the vehicle is again brought to a stop, when the governor will move the two-way valve to again connect the bellows 35 with the intake pipe of the engine. The bellows 35 will then collapse and start the time mechanism and if the operator does not stop the motor, by turning the key switch 7, it will be automatically stopped when the ratchet lever of the time mechanism trips the switch 9.

In Figs. 5 and 5ª, I have shown another modification in which the switches 8ᵇ and 9ᵇ in the ignition circuit 5, corresponding to the switch 8 and switch 9, respectively, in the previously described figures, are operated mechanically from a moving part of the motor. In Fig. 5, 39 indicates a shaft driven by the engine, which may be the shaft usually provided for operating the pump and distributor. A flexible shaft 40 is geared to the shaft 39, and drives a governor 41 and worm 42. This governor operates a switch arm 8ᶜ of the switch 8ᵇ, to close the switch when the motor starts and to open the switch when the motor stops. The worm engages a worm wheel 43, mounted on a short shaft 44, which is in alinement with a shaft 45 and adapted to be engaged therewith by a normally open clutch 46. One member of the clutch, on the shaft 45, is movable into and out of engagement with the other member on the shaft 44, by a lever 47. A spring 48 pulls the lever in one direction, to hold the clutch open, and a magnet 49 is provided for moving the lever in opposition to the spring, to engage the clutch members. When the motor is in operation, the worm gearing turns the shaft 44 slowly and if the clutch is engaged, the shaft 45 also turns slowly. The shaft 45 carries a segmental contact plate 50, which is normally held against a stop 51, by a light spring 52. This contact plate engages a pair of contacts 53, in the ignition circuit 5, these contacts and the plate forming the switch 9ᵇ. In the drawing, the plate is semi-circular in form and the stationary contacts engage the plate near one of its radial edges. The plate is turned by the operation of the motor in the direction of the arrow, Fig. 5ª, and when the shaft 45 has made a half revolution, the contacts pass off of the plate at its opposite radial edge and the ignition circuit is thereby interrupted. The circuit 21 of the magnet 49 is connected in the same way as in Fig. 1, from the ignition circuit at a point between the switches 8ᵇ and 9ᵇ, through the magnet coil to the switch 22 and thence to ground by a connection 21ᵃ. The switch 22 is normally closed and is controlled by the governor 24, driven by flexible shaft 23 from the propeller shaft 4.

In operation, when the motor is cranked to start it, the governor 41 closes the switch 8ᵇ and the motor starts, turning the shaft 44 slowly by the worm gearing. The closure of the switch 8ᵇ completes the circuit through the magnet and the latter attracts its armature on the lever 47 and moves the lever to engage the clutch members. The shaft 45 then turns with the contact plate 50, against the action of the spring 52, and if the vehicle is not started during the time that the plate is making a half-revolution, the motor will be stopped by the opening of the ignition circuit at the switch 9ᵇ when the contact plate passes beyond the fixed contacts 53. When the motor stops, the ignition circuit is opened at the switch 8ᵇ, by the governor 41, and the magnet becomes de-energized, releasing the clutch lever and allowing the clutch to become disengaged. When the clutch is disengaged, the spring 52 returns the contact plate 50 to its normal position, closing the switch 9ᵇ. The parts are then in position for again starting the motor. If, after the motor has been started, the vehicle is clutched to the motor before the ignition circuit is opened at the switch 9ᵇ, the starting of the motor will cause the switch 22 to open and interrupt the circuit through the magnet 49. This will release the clutch and the spring 52 will return the contact plate 50 to its normal position against the stop 51. While the vehicle is in operation, the contact plate 50 will remain in normal position; but as soon as the vehicle stops, the circuit through the magnet will be completed at the switch 22 and the contact plate will then begin to move and will open the ignition circuit, if the operator fails to open it at the key switch 7.

In Fig. 5, the arrangement is such that the idling motor is stopped after it has made a given number of revolutions; but as the idling motor turns at a practically constant speed, for any given adjustment of the throttle, the switch will be opened in a predetermined time after the starting of the motor, this time being adjustable by adjusting the throttle.

In Fig. 4, the only purpose of the switch 8 is to insure leaving the ignition circuit open while the motor is stopped, to avoid discharge of the battery. If the ignition current is supplied by a magneto, the same apparatus, omitting the switch 8 and bellows 12, may be used to open the ignition circuit and stop the motor.

What I claim is:

1. The combination with an internal combustion motor, a machine to be driven by the motor and means for connecting the motor to the machine, of means controlled by a driven part on the machine for stopping the motor in a predetermined time after the stoppage of the machine.

2. The combination with an internal combustion motor having an ignition circuit, a machine to be driven by the motor and means for connecting the motor to the machine, of means controlled by a driven part on the machine for rendering said circuit inoperative in a predetermined time after the stoppage of the machine.

3. The combination with an internal combustion motor, a machine and means for connecting the motor to the machine, of means controlled by the motor for automatically stopping the motor after it has idled for a predetermined time, and means controlled by a driven part on the machine for preventing the operation of the aforesaid means while the motor is driving the machine.

4. The combination with a motor vehicle having an internal combustion engine and an ignition circuit therefor, of a switch for rendering said circuit inoperative, time controlled means for actuating said switch, and means controlled by a driven part on the vehicle for causing the actuation of the time controlled means when the vehicle stops.

5. The combination with a motor vehicle having an internal combustion engine and an ignition circuit therefor, of a switch for rendering said circuit inoperative, time-controlled means for actuating said switch, means controlled by a driven part on the vehicle for causing the actuation of the time controlled means when the vehicle stops and for stopping the operation of said last mentioned means when the vehicle starts.

6. The combination with a motor vehicle having an internal combustion engine and an ignition circuit therefor, of a switch for rendering said circuit inoperative, time controlled means for actuating said switch, means controlled by a driven part on the vehicle for causing the actuation of the time-controlled means when the vehicle stops, and manually controlled means for delaying the operation of said last mentioned means.

7. The combination with an internal combustion motor having an ignition circuit, a machine to be driven by the motor and means for connecting the machine to the motor, of a switch in said circuit, time-controlled means for opening said switch after the motor has idled for a predetermined time, and means controlled by the machine for preventing the opening of said switch while the machine is running.

8. The combination with an internal combustion motor having an ignition circuit, a switch in said circuit and time mechanism for opening said switch, of a machine, means for connecting the machine to the motor, and means controlled by a driven part on the machine for preventing the opening of the switch while the machine is being driven by the motor.

9. The combination with an internal combustion motor having an ignition circuit, a switch for opening said circuit and time mechanism controlled by the motor for opening said switch, of a machine, means for connecting the machine to the motor, and means controlled by a driven part on the machine for preventing the opening of the switch while the machine is being driven by the motor.

10. The combination with a motor vehicle having an internal combustion driving motor and an ignition circuit for the motor, of means controlled by a driven part on the vehicle, for automatically opening said circuit in a predetermined time after the stoppage of the vehicle.

11. The combination with an internal combustion motor having an ignition circuit, of time-controlled means adapted to automatically render said circuit inoperative in a predetermined time after the motor starts to idle, and manually controlled means for delaying the actuation of said time-controlled means.

12. The combination with an internal combustion motor having an ignition circuit, of a switch in said circuit, time mechanism controlling the opening of said switch, and manually controlled means for delaying the actuation of said switch by said mechanism.

13. The combination with an internal combustion motor having an ignition circuit, of a normally closed switch in said circuit, time mechanism, a member movable with said mechanism for opening said switch, means controlled by the motor for starting the time mechanism when the motor starts to operate idly, and manually controlled means for setting said member back with respect to the time mechanism to delay the opening of the switch.

14. The combination with a motor vehicle having an internal combustion motor, the latter having an ignition circuit, of a normally closed switch in said circuit, time mechanism, a member movable with said mechanism for opening said switch, means controlled by the motor for starting the time mechanism when the motor starts to operate idly, and means controlled by a driven part on the vehicle for stopping said mechanism when the vehicle is in operation.

In testimony whereof I affix my signature.

ROBERT WATSON.